United States Patent Office 3,322,132
Patented May 30, 1967

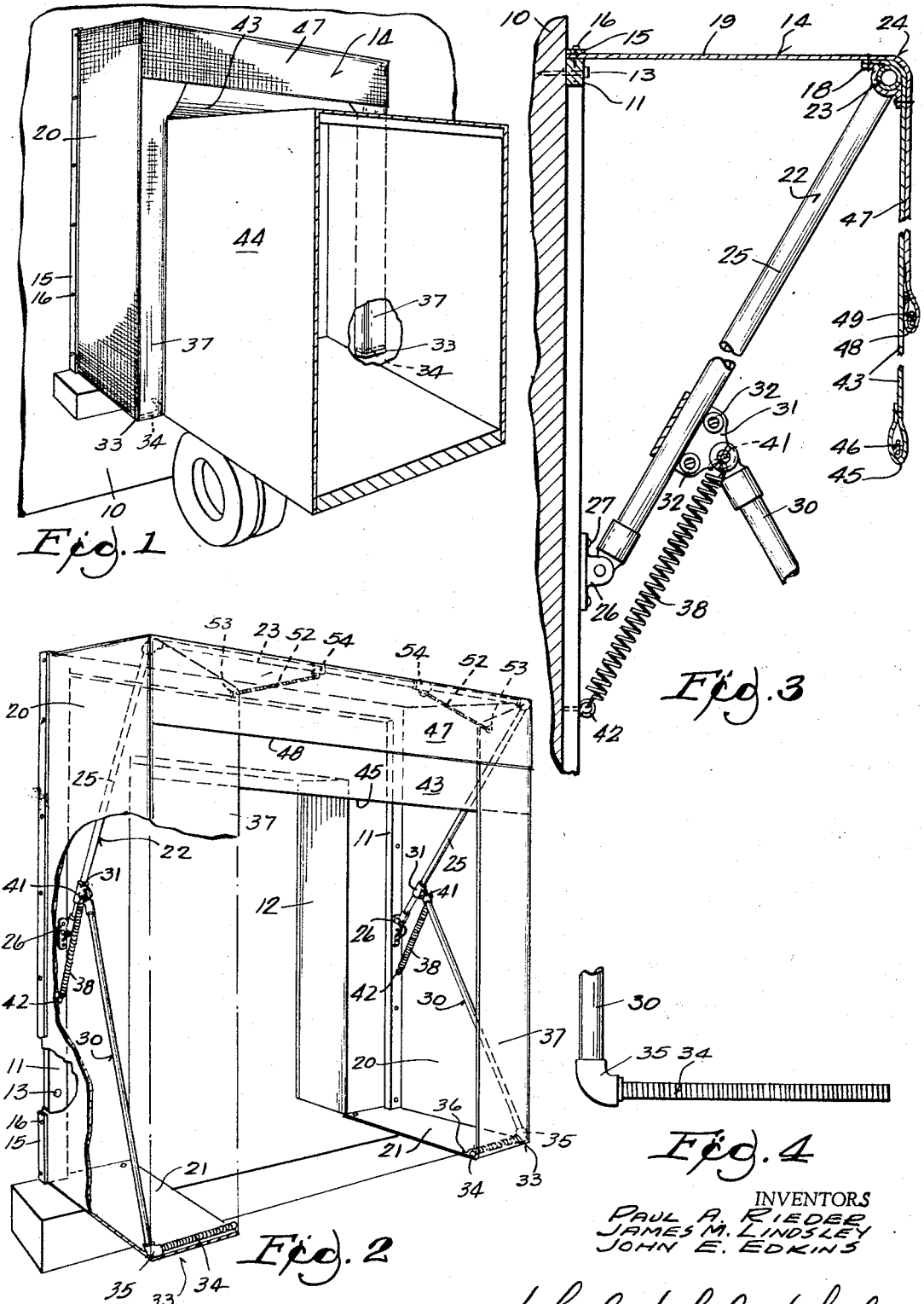

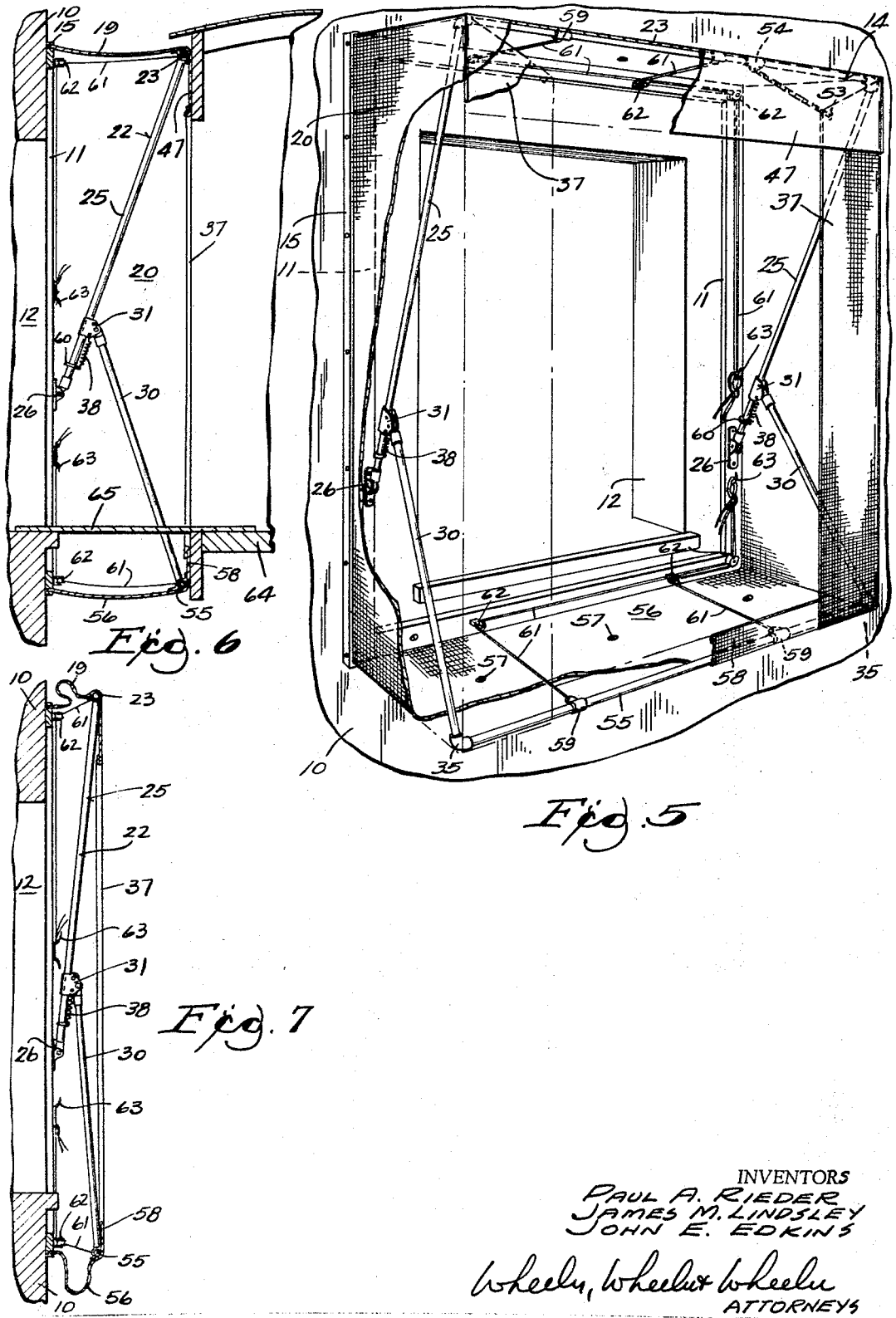

3,322,132
LOADING DOCK SHELTER
Paul A. Rieder, James M. Lindsley, and John E. Edkins, all of Fond du Lac, Wis., assignors to J. M. Nash Company, Inc., a corporation of Wisconsin
Filed May 13, 1964, Ser. No. 367,068
8 Claims. (Cl. 135—5)

This invention relates to a loading dock shelter.

The loading dock shelter of the present invention is simpler to fabricate and install than prior art shelters known to us. Because of its simplicity, the cost of the shelter is materially less than such prior art shelters, and it is less subject to mechanical disorder, with a corresponding reduction in the need for maintenance and repair.

Whereas prior art shelters known to us require the mounting to the warehouse of scissors arms, toggle joints, slide rods, etc., the framework of the shelter of the present invention has but two corresponding fixed pivotal connections at each side of the warehouse doorway. All parts of the framework are supported by these connections. Accordingly, installation procedures for devices embodying the present invention are materially simpler when compared to prior art devices known to us.

The shelter of the present invention is characterized by a first set of arms having a fixed pivotal connection to the warehouse and which extend from said connection toward engagement with a portion of a canvas enclosure or cover which is adapted to be connected to the warehouse about the doorway, a second set of arms slidably pivoted to the first arms and which extend therefrom toward engagement with another portion of the enclosure, and spring means biasing the slidably pivoted ends of the second set of arms toward the fixed pivotal connection of the first set of arms, thus to bias the shelter toward extended position.

Other objects, features and advantages of the invention will appear from the following disclosure in which:

FIGURE 1 is a fragmentary perspective view of a truck body backed telescopically into a truck loading dock shelter embodying the present invention.

FIGURE 2 is a perspective view on a larger scale showing the truck loading dock shelter of FIGURE 1 with portions of the cover removed to expose the framework, other portions of the framework being shown in broken lines.

FIGURE 3 is an enlarged fragmentary vertical cross section taken through the warehouse and shelter of FIGURES 1 and 2 and showing details of the loading dock shelter.

FIGURE 4 is a detail view of the lower end of one of the arms which supports a spring rod at the lower end of the shelter of FIGURES 1-3.

FIGURE 5 is a perspective view of another embodiment of the invention especially adapted for use on rail loading docks.

FIGURE 6 is a fragmentary vertical cross section on a reduced scale through a rail loading dock shelter of the type shown in FIGURE 5, showing the shelter spanning the space between a warehouse and a freight car.

FIGURE 7 is a fragmentary vertical cross section similar to that of FIGURE 6 with the freight car removed and the shelter retracted against the warehouse wall.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIGURES 1-4 show a truck loading dock shelter embodiment, and FIGURES 5-7 show a rail loading dock shelter embodiment. They are essentially the same and similar parts are given the same reference characters in the several views.

The loading dock shelter is conveniently attached to a warehouse 10 on a wooden framework 11 which is attached by nails 13 to the warehouse 10 around a doorway 12. A canvas or like waterproof fabric enclosure or cover 14 is attached to the wooden frame members 11 through the use of lag strips 15 fastened by nails 16 to the edges of the frame members 11.

The enclosure 14 may consist of one or more pieces of fabric, including top panel 19, side panels 20 and in the truck embodiment of FIGURES 1-4, partial bottom panels 21, as shown in FIGURE 2.

The canvas enclosure 14 is supported from the warehouse on an extensible frame which comprises an inverted U-shaped subframe 22. The subframe 22 comprises a set of side arms 25 cross connected at their upper ends by a cross member 23 fastened to the upper front corner 24 of the canvas enclosure 14, as by sewing it in a hem or pocket 18 as shown in FIGURE 3. Arms 25 are fixedly pivoted at their lower ends to the warehouse at opposite sides of the doorway on fixed hinges 26. Hinges 26 are fastened by screws 27 or the like to the wooden frame members 11. Accordingly, U-shaped subframe 22 may pivot on hinges 26 between an extended position, as shown in FIGURES 2 and 3, and a retracted positon similar to that shown in FIGURE 7.

The frame further comprises a second set of arms 30. These are pivotally and slidably connected to the arms 25 of the U-shaped frame 22 on the sliding hinges 31. The sliding hinges 31 are desirably provided with anti-friction rollers 32 which bear on the arms 25, as best shown in FIGURE 3. The several arms, etc. of the frame are desirably made of tubular pipe stock, although angle irons, etc. could be substituted therefor.

The ends of the arms 30 remote from the sliding hinges 31 are engaged with the bottom front corners 33 of the canvas enclosure 14 by means of spring rods 34 which are fastened to elbows 35 at the ends of the arms 30. The spring rods 34 are received within hems or pockets 36 formed between the bottom portions 21 of the enclosure and front flaps 37 of the enclosure.

The sliding hinges 31 are biased downwardly on the arms 25 toward the fixed hinges 26 by springs 38. In the embodiment shown in FIGURES 1-4, corresponding ends of the springs 38 are connected to the sliding hinges 31 on eyes 41 of the pivot pins on which the arms 30 swing. Corresponding opposite ends of the springs 38 are connected to the wooden framework 11 on screweyes 42, the position of which can be changed to adjust the tension on the springs 38.

The enclosure 14 is desirably provided with head flaps 43, 47 to seal between the enclosure 14 and the top of a truck body 44, as shown in FIGURE 1. The top portion 19 of the cover is desirably continued past the upper corner 24 of the enclosure to provide the flap 47. A separate flap 43 is desirably provided in the truck shelter of FIGURES 1-4 to accommodate for different height trucks. The respective flaps 43, 47 have respective hems 45, 48 with respective chain weights 46, 49 to seal against the truck roofs.

The front flaps 37 of the enclosure 14 may constitute continuations of the side panels 20. They are desirably kept taut by elastic stretch cords 52 connected to their upper ends. Corresponding ends of the cords 52 are fastened to grommets 53 near the upper ends of the flaps 37. The opposite ends of the stretch cords 52 are attached to clamps 54 which are adjustably positioned along the cross member 23 of the U-shaped subframe 22 to impose proper tension on the cords 52.

In normal use, the truck body 44 will be backed toward the doorway 12 and will telescope within the enclosure 14, as shown in FIGURE 1. The spring rods 34 will yield under pressure of the truck sides to pass the truck body. The top flap 43 will seal around the top of the truck body and the flaps 37 will seal around the sides of the truck body. A dockboard similar to the one shown at 65 in FIGURE 6 will ordinarily bridge the gap between the bed of the truck and the floor of the dock, thus to cooperate with the partial bottom panels 21 to close the bottom of the enclosure.

The truck loading dock shelter shown in FIGURES 1–4 will ordinarily be extended at all times, as shown in these views. However, if a truck backing toward the doorway is off center and hits one side or the other of the enclosure, the springs 38 at such side will yield to permit that side of the enclosure to retract inwardly and assume a position similar to that shown in FIGURE 7. When this happens, the sliding hinge 31 at the retracting side of the enclosure will slide upwardly on its arm 25 as its spring 38 yields and the respective arms 25, 30 at that side of the enclosure will swing inwardly. The tautness of the panels 20, 37 at that side of the enclosure 14 will preclude any increase in the spacing between the upper and lower ends of the respective arms 25, 30. When the truck moves away from the shelter to release its pressure thereagainst, spring 38 will draw the sliding hinge 31 downwardly along the arm 25 toward the fixed hinge 26 thereof and will bias the shelter outwardly to its fully extended position to the extent permitted by the width of the canvas panels 19, 20 and 21, as shown in FIGURES 1, 2 and 3.

As previously noted, FIGURES 5, 6 and 7 show an embodiment of the invention adapted for use on rail loading docks. The over-all structure is essentially the same as previously described and similar parts are given the same reference characters. In this embodiment the lower ends of the arms 30 are cross connected by a pipe frame member 55 which replaces the spring rods 34 of the truck loading dock shelter. Pipe 55 completely spans the space between the elbows 35 at the lower ends of arms 30. Moreover, the partial bottom panels 21 of the truck embodiment are replaced by a bottom cover panel 56 which completely closes the bottom of the enclosure 14. Panel 56 may be provided with drain holes 57 to release any water that might collect on the bottom panel 56. A front margin 58 of panel 56 may optionally be extended around the pipe 55 to form a front flap.

The springs 38 of this embodiment are illustrated as having a somewhat different anchorage than those shown in the embodiment of FIGURES 2 and 3, although either embodiment may have either anchorage. As shown in FIGURES 5, 6 and 7, arms 25 may be provided with adjustable cramping rings 60 to which corresponding ends of springs 38 are connected. The cramping rings 60 may be adjusted longitudinally of the arms 25 to change the tension of the springs 38.

In this embodiment head flap 43 may optionally be omitted, as shown, leaving only head flap 47 at the top front of the enclosure 14.

The rail loading dock shield shown in FIGURES 5, 6 and 7 is desirably provided with top and bottom pairs of draw lines 61 which are connected to the respective top and bottom cross members 23, 55 on sleeves 59 and are reeved over pulleys 62 and respectively made fast to cleats 63 desirably anchored on the same side of the doorway on wooden frame member 11. When the shelter is out of service the lines 61 will be pulled in to retract the shelter, as shown in FIGURE 7, thus to clear the space between the warehouse 10 and the railroad right of way. When freight car 64 is spotted opposite the dock doorway 12, lines 61 will be released and the pressure of springs 38 will extend the shelter against the side of the rail car 64 and about its doorway as shown in FIGURE 6, thus to seal the space between the dock and the car. A dockboard 65 will then be laid down for movement of materials between the dock and the car.

The arms 25 of the embodiment shown in FIGURES 5, 6 and 7 are shown in the accompanying drawings as somewhat longer than those shown in FIGURES 2 and 3, and the fixed pivotal connection 36 thereof to the warehouse is at a lower level than in the embodiment shown in FIGURES 1, 2 and 3. Correspondingly, the arms 30 of the embodiment of FIGURES 5, 6 and 7 are shown as somewhat shorter than the arms 30 in the embodiment of FIGURES 1, 2 and 3. The specific showings herein are exemplary only. In practice, the arms 25 used on both the rail and truck shelters are made longer, as shown in FIGURES 5, 6 and 7, although this is not critical.

Viewed from the side, the frame 11 and arms 25, 30 are interconnected in the form of the letter K. Accordingly, we sometimes refer to the loading dock shelter of the present invention as having a K-frame.

What is claimed is:

1. An extensible loading dock shelter for mounting on a warehouse or the like in enclosing relation to a doorway thereof comprising:
    an extensible frame,
    a cover mounted on the frame and adapted to be connected to the warehouse about said doorway to form an enclosure extending outwardly from the warehouse,
    said frame comprising:
        a first set of arms having corresponding first ends adapted to be pivotally connected to the warehouse at fixed points at the sides of the doorway and corresponding second ends engaged with a portion of the cover,
        a second set of arms having corresponding first ends slidably and pivotally connected with said first arms intermediate the first and second ends thereof and corresponding second ends engaged with another portion of the cover,
        and means for biasing the said first ends of the second set of arms along said first set of arms and toward the said first ends of the first set of arms to bias the shelter toward extended position.

2. The shelter of claim 1 in which which one of said sets of arms is provided with a member cross connecting the corresponding second ends thereof to constitute said set and member a U-shaped frame.

3. The shelter of claim 2 in which the other of said sets of arms is provided with spring rods extending partially toward one another from the second ends of said arms to leave space for a truck body to pass between said arms and for the spring rods to yield to admit such truck body.

4. An extensible loading dock shelter for mounting on a warehouse or the like in enclosing relation to a doorway thereof comprising:
    an extensible frame,
    a cover mounted on the frame and adapted to be connected to the warehouse about said doorway to form an enclosure having a top and sides extending outwardly from the warehouse a distance no greater than the width of said top and sides,
    said frame comprising:
        an inverted U-shaped subframe having a cross piece engaged with the top of the enclosure and a first set of arms in fixed pivotal connection with the warehouse at the sides of the doorway and swingable on said connections between a retracted and extended position with respect to the warehouse,
        a second set of arms having corresponding first ends slidably and pivotally connected with the arms of the U-shaped subframe and corresponding second ends operatively engaged with the lower ends of the sides of the enclosure and swingable on said slidable and pivoted connection between a retracted and extended position with respect to the warehouse,
        and spring means for biasing the first ends of said second set of arms toward the fixed pivotal connection of the first set of arms to the warehous to bias the shelter toward extended position.

5. The shelter of claim 4 in which the second set of arms are provided with a member cross connecting their corresponding second ends to constitute said second set and member a second U-shaped frame.

6. The shelter of claim 4 in which the second set of arms is provided with spring rods extending partially toward one another from the second ends of said arms to leave space for a truck body to pass between said arms and for the spring rods to yield to admit such truck body.

7. An extensible loading dock shelter for mounting on a warehouse or the like in enclosing relation to a doorway thereof comprising:
    an extensible frame,
    a cover mounted on the frame and adapted to be connected to the warehouse about said doorway to form an enclosure extending outwardly from the warehouse,
    said frame comprising:
        a first set of arms having corresponding first ends adapted to be pivotally connected to the warehouse at the sides of the doorway and corresponding second ends engaged with a portion of the cover,
        a second set of arms having corresponding first ends slidably and pivotally connected with said first arms and corresponding second ends engaged with another portion of the cover,
        the connections of said first and second sets of arms disposing said sets in a K-shaped configuration with said warehouse,
    and means for biasing the said first ends of the second set of arms toward the said first ends of the first set of arms to bias the shelter toward extended position.

8. An extensible loading dock shelter for mounting on a warehouse or the like in enclosing relation to a doorway thereof comprising: an extensible frame, a cover mounted on the frame and adapted to be connected to the warehouse about said doorway to form an enclosure extending outwardly from the warehouse, said frame comprising: a first set of arms having corresponding first ends adapted to be pivotally connected to the warehouse at fixed points at the sides of the doorway and corresponding second ends engaged with a portion of the cover, a second set of arms having corresponding first ends slidably and pivotally connected with said first arms intermediate the first and second ends thereof and corresponding second ends engaged with another portion of the cover, the said first ends of the second set of arms being slidable along said first set of arms and toward the said first ends of the first set of arms as the shelter is moved toward extended position.

References Cited

UNITED STATES PATENTS

| | | | |
|---|---|---|---|
| 2,567,995 | 9/1951 | Eshnaur | 135—5 |
| 2,798,502 | 7/1957 | D'Azzo | 135—5 |
| 2,840,091 | 6/1958 | D'Azzo | 135—5 |
| 2,892,463 | 6/1959 | Frommelt et al. | 135—5 |

DAVID J. WILLIAMOWSKY, *Primary Examiner.*

REINALDO P. MACHADO, HARRISON R. MOSELEY, *Examiners.*

P. M. CAUN, L. J. SANTISI, *Assistant Examiners.*